United States Patent
Lee et al.

(10) Patent No.: US 8,934,506 B2
(45) Date of Patent: Jan. 13, 2015

(54) APPARATUS AND METHOD FOR ESTIMATING TIME STAMP

(75) Inventors: Seung-Woo Lee, Daejeon-si (KR); Bhum-Cheol Lee, Daejeon-si (KR); Jung-Hee Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 443 days.

(21) Appl. No.: 13/328,269

(22) Filed: Dec. 16, 2011

(65) Prior Publication Data
US 2012/0155497 A1 Jun. 21, 2012

(30) Foreign Application Priority Data
Dec. 17, 2010 (KR) .................. 10-2010-0130271

(51) Int. Cl.
*H04J 3/06* (2006.01)
(52) U.S. Cl.
CPC .................................... *H04J 3/0697* (2013.01)
USPC .......................................... 370/503; 370/508
(58) Field of Classification Search
None
See application file for complete search history.

(56) References Cited

U.S. PATENT DOCUMENTS

| | | | |
|---|---|---|---|
| 6,704,329 B2 | 3/2004 | Martin | |
| 7,489,706 B2 * | 2/2009 | Hatley et al. | 370/469 |
| 7,551,647 B2 | 6/2009 | Fellman et al. | |
| 8,625,640 B2 * | 1/2014 | Wei | 370/503 |
| 2009/0190613 A1 * | 7/2009 | Finn | 370/509 |
| 2009/0310625 A1 * | 12/2009 | Roberts et al. | 370/498 |
| 2011/0216787 A1 * | 9/2011 | Ai et al. | 370/503 |
| 2011/0296226 A1 * | 12/2011 | Sorbara et al. | 713/400 |

* cited by examiner

*Primary Examiner* — Robert C Scheibel
(74) *Attorney, Agent, or Firm* — Staas & Halsey LLP (57) ABSTRACT

An apparatus includes a difference extraction unit to extract a difference between a second time stamp value, which is obtained by adjusting a first time stamp value that is measured at a time of arrival of a synchronization message transmitted by the master at a Layer 3 to be synchronized in frequency with a clock of the master, and a third time stamp value, which is measured at a time of departure of the synchronization message from the master; a minimum filter to select a minimum from one or more difference values extracted by the difference extraction unit; and a delay variation calculation unit to estimate a time of arrival of a current synchronization message at the Layer 3 based on the selected minimum and calculate a delay variation.

17 Claims, 9 Drawing Sheets

APPARATUS AND METHOD FOR ESTIMATING TIME STAMP

CROSS-REFERENCE TO RELATED APPLICATION(S)

This application claims the benefit under 35 U.S.C. §119(a) of Korean Patent Application No. 10-2010-0130271, filed on Dec. 17, 2010, in the Korean Intellectual Property Office, the entire disclosure of which is incorporated herein by reference for all purposes.

BACKGROUND

1. Field

The following description relates to a technique for measuring a virtual time stamp value, and more particularly, to an apparatus and method for precisely estimating a virtual time stamp value based on a time stamp value that is measured in a network system.

2. Description of the Related Art

Synchronous transmission systems such as time division multiplexers (TDMs), synchronous optical network (SONET)/synchronous digital hierarchy (SDH) systems use various clock systems to transmit synchronous data in metro- or wide area network (WAN) areas. However, the design of such complicated clock systems is difficult and costly.

On the other hand, in local area network (LAN) areas, Ethernet-based asynchronous networks are widely used. Asynchronous networks have been widespread because they use an asynchronous clock system and are thus easy to design and relatively cheap. The Ethernet has expanded its way into metro- or WAN areas, and has been widely employed in networks that require a data processing speed of dozens of Gbps or higher. However, to maintain real-time audio or multimedia services that are previously provided to existing time-division multiplexing (TDM) networks, it is necessary to provide synchronization with a clock while using the Ethernet.

According to network synchronization techniques available for use in packet networks, a clock system is generally configured to have a hierarchical structure including a master and a slave or a server and a client. A master may provide frequency information and time information to a slave, and the slave may synchronize its clock in frequency or phase with the clock of the master. In the case of synchronizing the slave with the master using a packet network, there is no need to provide an additional architecture for maintaining the slave to be synchronized with the master in metro- or WAN areas, and it is possible to transmit data at low cost.

In the meantime, Network Time Protocol and Precision Time Protocol (PTP) are packet-based network time protocols for synchronization. More specifically, NTP is one of the most dominant protocols for synchronizing a master and a slave that are connected to a network, and is widely used in LAN and WAN areas. According to NTP, computers that are connected to a network may be synchronized with one another using Coordinated Universal Time (UTC), which is the time standard by which the world regulates clocks and time. NTP can provide a precision of several or dozens of milliseconds in a typical Internet environment at low cost without a requirement of additional hardware equipment. However, NTP may not be suitable for use in fields of application where precise time synchronization is required, for example, in the field of multimedia streaming services for packet switching networks, due to its precision limitations. Accordingly, the demand for time protocols for synchronization capable of providing a higher precision than NTP has arisen, and the Institute of Electrical and Electronics Engineers (IEEE) has developed and standardized PTP, which can offer a higher precision than NTP.

PTP version 2, i.e., the IEEE 1588-2008 standard, was released. PTP version 2 is designed for use in measurement and control systems for synchronization. According to IEEE PTP, a clock system may be configured to have a hierarchical structure including a master and a slave.

A master and a slave may compare a database corresponding to their clock property information with a database corresponding to clock property information of an external master on a port in a network that generates each clock according to a best master clock (BMC) algorithm According to PTP, a master and a slave may be synchronized with each other by exchanging time information, messages and/or synchronization signals. More specifically, an offset O between the clocks of the master and the slave and a delay in the transmission of messages between the master and the slave via a network, i.e., a propagation delay D, may be determined based on messages or synchronization signals that are transmitted between the master and the slave, and the clock of the slave may be synchronized with the clock of the master based on the results of the determination.

The master and the slave may exchange various synchronization messages (for example, SYNC, FOLLOW UP, DELAY REQ, and DELAY RESP) with each other, may measure the time of departure or arrival of each of the various synchronization messages, and may calculate the offset O and the propagation delay D. As a result of final time synchronization, the slave may obtain time information $t1$, $t2$, $t3$, and $t4$ of the various synchronization messages, and may calculate the offset O and the propagation delay D based on the time information $t1$, $t2$, $t3$, and $t4$. For example, the propagation delay D may be calculated using the following equation: $D=((t2-t1)+(t4-t3))/2$. For example, the offset O, which is for compensating for any difference between the clocks of the master and the slave, may be calculated using the following equation: $O=((t2-t1)-(t4-t3))/2$. By reflecting the offset O to the time of the slave, it is possible to synchronize the time of the slave with the time of the master and the time of the network to which the slave and the master are both connected.

PTP, unlike NTP, measures time stamp values corresponding to the times of departure and arrival of a synchronization signal using auxiliary hardware equipment and calculates the offset between the clocks of a master and a slave and a propagation delay based on the time stamp values. Accordingly, PTP can provide a high precision of several microseconds or less. PTP requires hardware equipment for measuring time stamp values, and the hardware equipment is required to recognize a packet that follow PTP, detect a predetermined pattern from the beginning of the packet, and store a time stamp value corresponding to the time of detection of the predetermined pattern. The stored time stamp value may be transmitted to a host processor in which a protocol stack is driven, and the host processor may calculate an offset and a propagation delay for synchronization based on the time stamp value provided by the hardware equipment.

SUMMARY

The following description relates to measuring a time stamp value in an interface between Layers 2 and 3 and precisely estimating a time stamp value between Layers 1 and 2 based on the measured time stamp value.

In one general aspect, there is provided an apparatus for estimating a time stamp, which synchronizes itself in time with a master, the apparatus including: a difference extraction unit configured to extract a difference between a second time stamp value, which is obtained by adjusting a first time stamp value that is measured at a time of arrival of a synchronization message transmitted by the master at a Layer 3 to be synchronized in frequency with a clock of the master, and a third time stamp value, which is measured at a time of departure of the synchronization message from the master; a minimum filter configured to select a minimum from one or more difference values extracted by the difference extraction unit; and a delay variation calculation unit configured to estimate a time of arrival of a current synchronization message at the Layer 3 based on the selected minimum and calculate a delay variation, which corresponds to a difference between the estimated time of arrival of the current synchronization message at the Layer 3 and the second time stamp value.

In another general aspect, there is provided a virtual time-stamping apparatus that synchronizes itself in time with a master, the virtual time-stamping apparatus including: a Layer 2 module configured to multiplex data provided by a master and other regular data traffic and transmit the multiplexed data; an apparatus for estimating a time stamp, configured to obtain a minimum difference between a second time stamp value, which is obtained by adjusting a first time stamp value that is measured at a time of arrival of a synchronization message transmitted by the master at a Layer 3 to be synchronized in frequency with a clock of the master, and a third time stamp value, which is measured at a time of departure of the synchronization message from the master, and calculate a delay variation, which corresponds to a difference between a time of arrival of a current synchronization message at a Layer 3 and the second time stamp value using the minimum difference; and an offset calculation unit configured to calculate an offset between the local clock of the apparatus and the clock of the master based on the calculated delay variation; and a synchronization unit configured to synchronize the apparatus in time with the master using the calculated offset.

In another general aspect, there is provided a method of estimating a time stamp for synchronization in time with a master, the method including: extracting a difference between a second time stamp value, which is obtained by adjusting a first time stamp value that is measured at a time of arrival of a synchronization message transmitted by the master at a Layer 3 to be synchronized in frequency with a clock of the master, and a third time stamp value, which is measured at a time of departure of the synchronization message from the master; selecting a minimum from one or more extracted difference values; and estimating a time of arrival of a current synchronization message at the Layer 3 based on the selected minimum; and calculating a delay variation, which corresponds to a difference between the estimated time of arrival of the current synchronization message at the Layer 3 and the second time stamp value.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
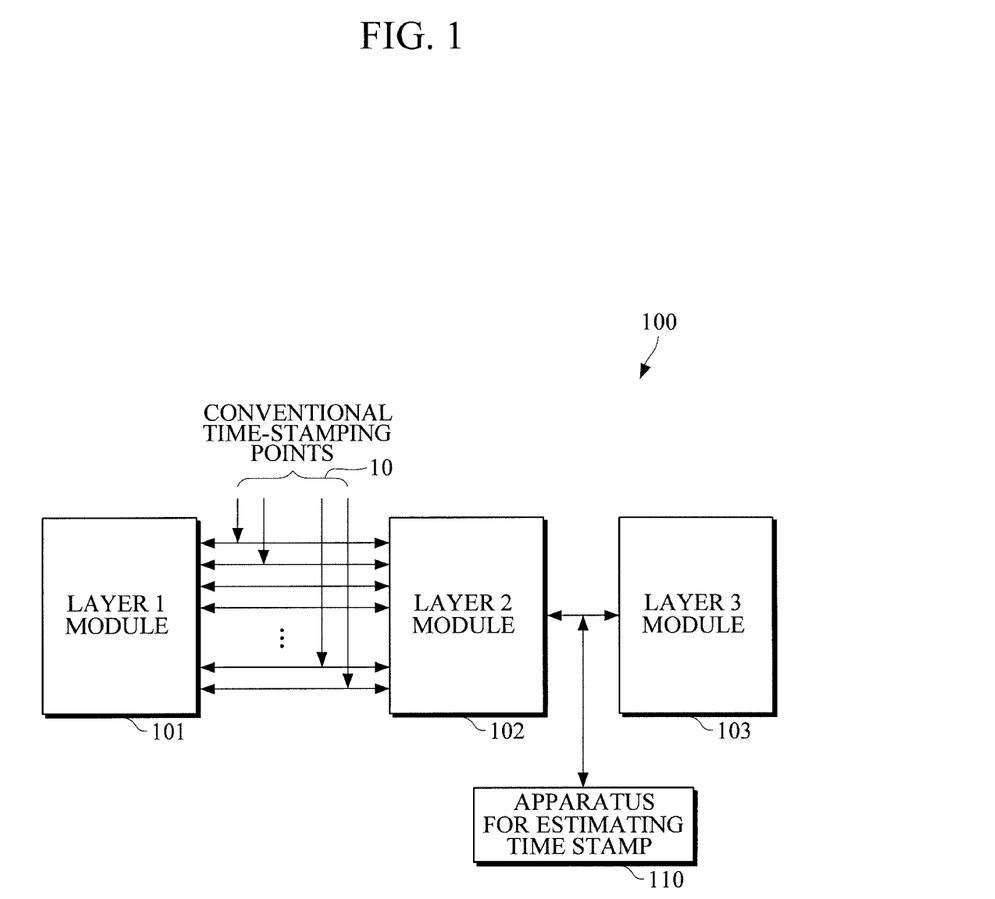
FIG. 1 is a diagram illustrating an example of a virtual time-stamping apparatus that applies a time synchronization protocol in a packet network.

FIG. 1 illustrates an example of a virtual time-stamping apparatus that applies a time synchronization protocol in a packet network.

Referring to FIG. 1, virtual time-stamping apparatus 100 includes a Layer 1 module 101, a Layer 2 module 102, a Layer 3 module 103, and an apparatus 110 for estimating a time stamp. For example, the virtual time-stamping apparatus 100 may be implemented as a slave device or a bridge device that is to be synchronized with a master device (not shown).

The apparatus 110 may measure a time stamp value in an interface between the Layer 2 module 102 and the Layer 3 module 103. The measurement of the time stamp value in the interface between the Layer 2 module 102 and the Layer 3 module 103 may be interpreted as measuring a time stamp value at the time of arrival of a message at the Layer 3 module 103. For example, the interface between the Layer 2 module 102 and the Layer 3 module 103 may be a system packet interface (SPI). For example, in response to the interface between the Layer 2 module 102 and the Layer 3 module 103 being an SPI 4.2 interface, it may have 10 Gbps transmission capability. In this example, in a case in which the Layer 2 module 102 and the Layer module 101 include multiple ports (for example, 10×1 G ports), data input via each of the multiple ports may be transmitted from the Layer 2 module 102 to the Layer 3 module 103 in a frame interleave manner through multiplexing.

Conventionally, media independence interface (MII) or gigabit MII (GMII) signals that connect the Layer 1 module 101 and the Layer 2 module 102 are used to measure a time stamp value using hardware. In this case, a time stamp value may be measured using data transmitted between the Layer 1 module 101 and the Layer 2 module 102. For example, an Ethernet interface network system using ten 1 G Ethernet ports and offering 10 Gbps transmission capability may include ten 1 G media access control (MAC) layers and a physical (PHY) layer. To measure a time stamp value to apply PTP to the Ethernet interface network system, a hardware device for measuring a time stamp value in the interface between the PHY layer and the ten 1 G MAC layers may be required. However, such hardware device may require a large hardware area to support all the ten 1 G Ethernet ports.

The virtual time-stamping apparatus 100 may measure a time stamp value in the interface between the Layer 2 module 102 and the Layer 3 module 103 using the apparatus 110, instead of measuring a time stamp value in the interface between the Layer 1 module 101 and the Layer 2 module 102, i.e., a time stamp value at the time of arrival of a message at the layer 2 module 102. The apparatus 110 may measure a time stamp value at a virtual time-stamping point between the Layer 2 module 102 and the Layer 3 module 103, and may thus estimate an equivalent of a time stamp value that is measured at a conventional time-stamping point 10.

An example of measuring a time stamp value at the virtual time-stamping point is further described with reference to FIGS. 2 through 5.

Figure 2:
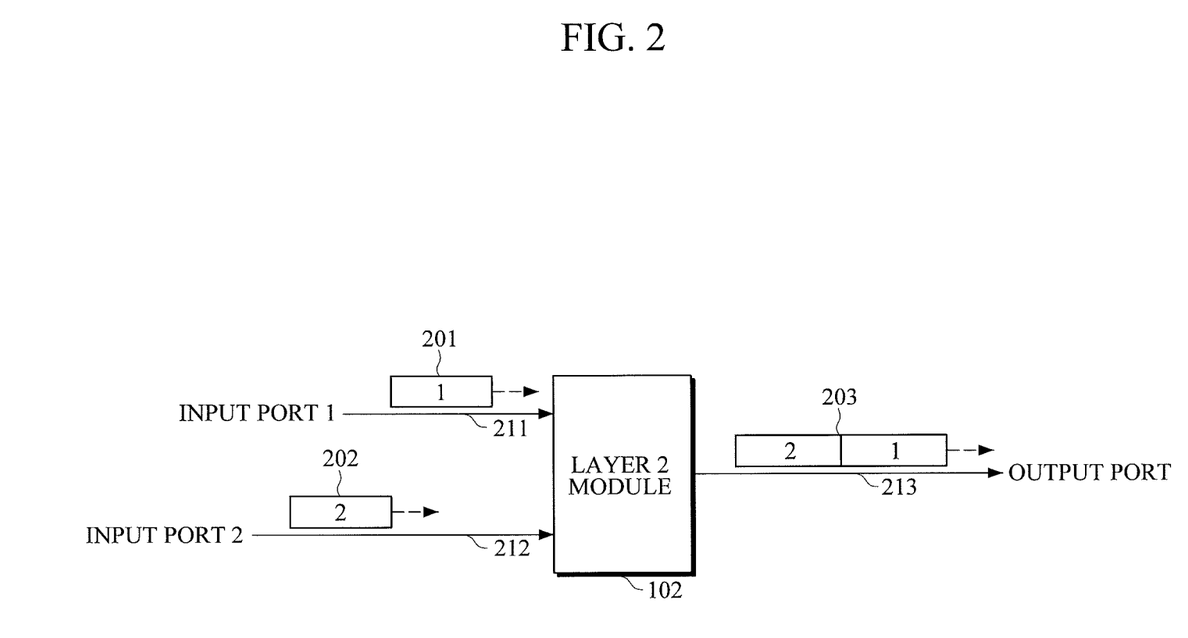
FIG. 2 is a diagram illustrating an example of a frame interleave-type packet transmission method.

FIG. 2 illustrates an example of a frame interleave-type packet transmission method.

Referring to FIG. 2, in the case of transmitting two low-speed data 201 and 202 in parallel and multiplexing the two low-speed data 201 and 202 into single high-speed data 203 using the Layer 2 module 102, two input ports (i.e., first and second input ports 211 and 212) and one output port 213 may be provided.

A packet that is input to the first input port 211 is referred to as packet 1 (201), and a packet that is input to the second input port 212 is referred to as packet 2 (202). Assume that packet 1 (201) arrives at the first input port 211 at a time tA1, and that packet 2 (202) arrives at the second input port 212 at a time tA2, that the arrival time tA1 is earlier than the arrival time tA2, and that the amount of time that it takes for the Layer 2 module 102 to perform packet processing is TP.

A time tD1 of departure of packet 1 (201) from the output port 213 may be the same as the sum of the arrival time tA1 and the processing time TP, i.e., tD1=tA1+TP. A time tD2 of departure of packet 2 (202) from the output port 213 may not necessarily be the same as the same as the sum of the arrival time tA2 and the processing time TP because packet 2 (202) needs to wait for packet 1 (201) to be processed by the Layer 2 module 102. The layer 2 module 102 may include a storage (not shown), such as a first-in-first-out (FIFO) buffer, for temporarily storing packets waiting to be processed.

Accordingly, the departure time tD2 may be the same as the sum of the arrival time tA2, a waiting time tW experienced by packet 2 (202) while waiting for packet 1 (201) to be processed, and the processing time TP, i.e., tD2=tA2+TP+tW. The waiting time tW may be determined by the processing time TP, the length of packet 1 (201), and the arrival time tA1 of packet 1 (201), and may range from 0 to a maximum of the length of packet 1 (201).

Referring to FIG. 2, in a case in which packet 1 (201) and packet 2 (202) are transmitted in a frame interleave manner, one of packet 1 (201) and packet 2 (202) may need to wait for the other packet to be completely transmitted. Therefore, the amount of time that it takes to transmit data from the Layer 2 module 102 to the Layer 3 module 103 may be affected by the state of transmission of data in other channels, the state of any data waiting in the storage (for example, a FIFO buffer) of the Layer 2 module 102 to be transmitted.

If a time stamp value is measured in the Layer 3 module 103 for high-speed serial data, each time stamp value corresponding to multiplexed data that arrives at the Layer 2 module 102 may be estimated based on the sum of the time stamp value of low-speed parallel data, the transmission time of a FIFO buffer of the Layer 2 module 102, and the amount of time for which the low-speed parallel data stays in the FIFO buffer. However, since the amount of time for which the low-speed parallel data stays in the FIFO buffer is not uniform but varies, it may not be precise to estimate a time stamp value corresponding to the Layer 2 module 102 based on a measured time stamp value for the high-speed serial data.

Assume that one input port of the virtual time-stamping apparatus 100 is connected to a master 200 to apply a network synchronization technique to a network system equipped with an Ethernet interface, that other input ports of the virtual time-stamping apparatus 100 are used for transmitting regular data traffic, and that the virtual time-stamping apparatus 100 serves as a slave to be synchronized with the master 200.

Figure 3:
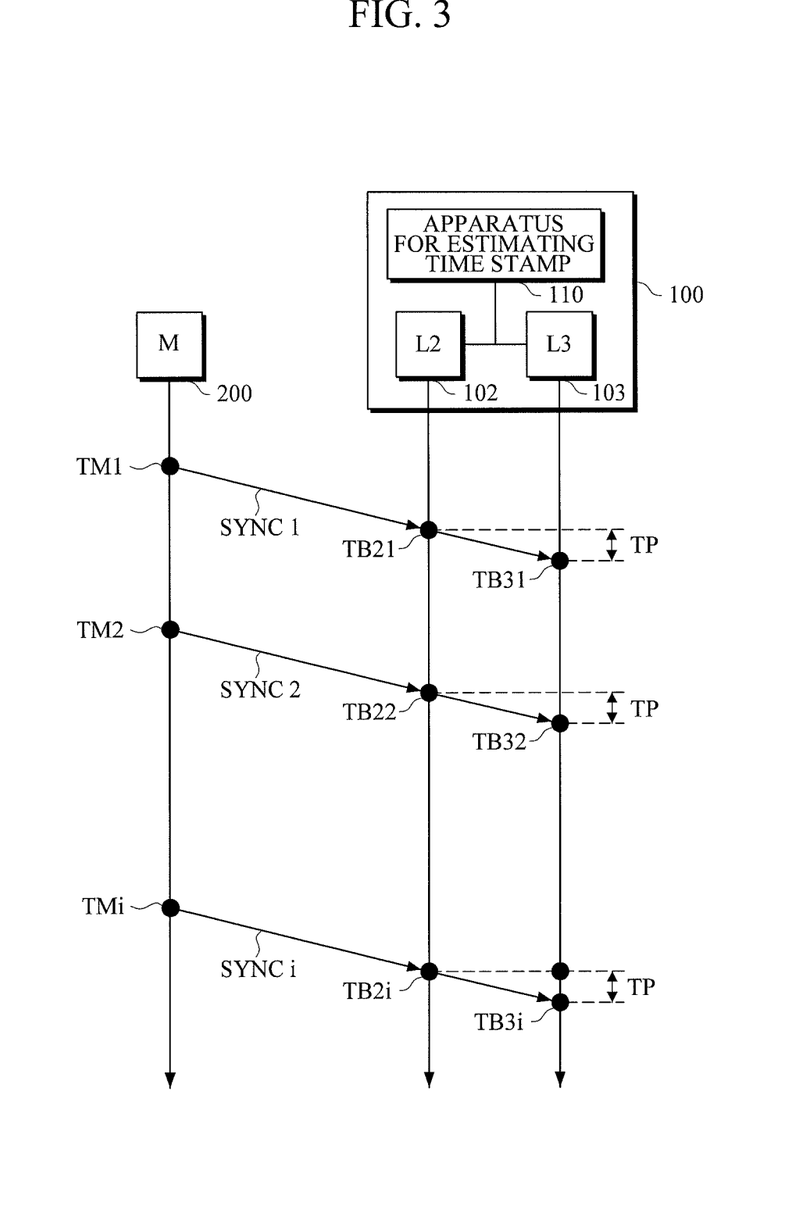
FIG. 3 is a diagram illustrating an example of synchronizing the clock of a master and the clock of a virtual time-stamping apparatus.

FIG. 3 illustrates an example of synchronizing the clock of the master 200 and the clock of the virtual time-stamping apparatus 100.

Referring to FIG. 3, the virtual time-stamping apparatus 100 may correspond to a slave that operates in synchronization with the clock of the master 200. An example of measuring a time stamp value in the Layer 2 module 102 and the Layer 3 module 103 in a case in which there is no delay variation is described with reference to FIG. 3.

The master 200 may transmit an i-th synchronization message SYNC i to the virtual time-stamping apparatus 100 to be synchronized with the virtual time-stamping apparatus 100. The i-th synchronization message SYNC i may include an i-th master time stamp value TMi of the master 200. An i-th Layer 2 time stamp value TB2$i$ may correspond to the time of arrival of the i-th synchronization message SYNC i at the Layer 2 module 102, and may be measured between the Layer 1 module 101 and the Layer 2 module 102. An i-th Layer 3 time stamp value TB3$i$ may correspond to the time of arrival of the i-th synchronization message SYNC i at the Layer 3 module 103, and may be measured between the Layer 2 module 102 and the Layer 3 module 103.

If the master 200 transmits only the i-th synchronization message SYNC i to the virtual time-stamping apparatus 100 and regular data traffic that are transmitted via other ports is processed quickly enough to cause no delay variation, the i-th synchronization message SYNC i may be transmitted to the Layer 3 module 103 immediately after being arrived at the Layer 2 module 102.

Accordingly, it takes only a predetermined amount of processing time TP between the Layer 2 module 102 and the Layer 3 module 103, and the i-th Layer 3 time stamp value TB3$i$ that is measured in the Layer 3 module 103 may be measured as the sum of the i-th Layer 2 time stamp value TB2$i$ that is measured in the Layer 2 module 102 and the processing time TP. The i-th Layer 3 time stamp value TB3$i$ may be represented by Equation (1):

$$TB3i=TB2i+TP \qquad (1)$$

where TB2$i$ indicates the i-th Layer 2 time stamp value measured at the time of arrival of the i-th synchronization message SYNC i at the Layer 2 module 102 and TB3$i$ indicates the i-th Layer 3 time stamp value at the time of arrival of the i-th synchronization message SYNC i at the Layer 3 module 103.

Figure 4A:
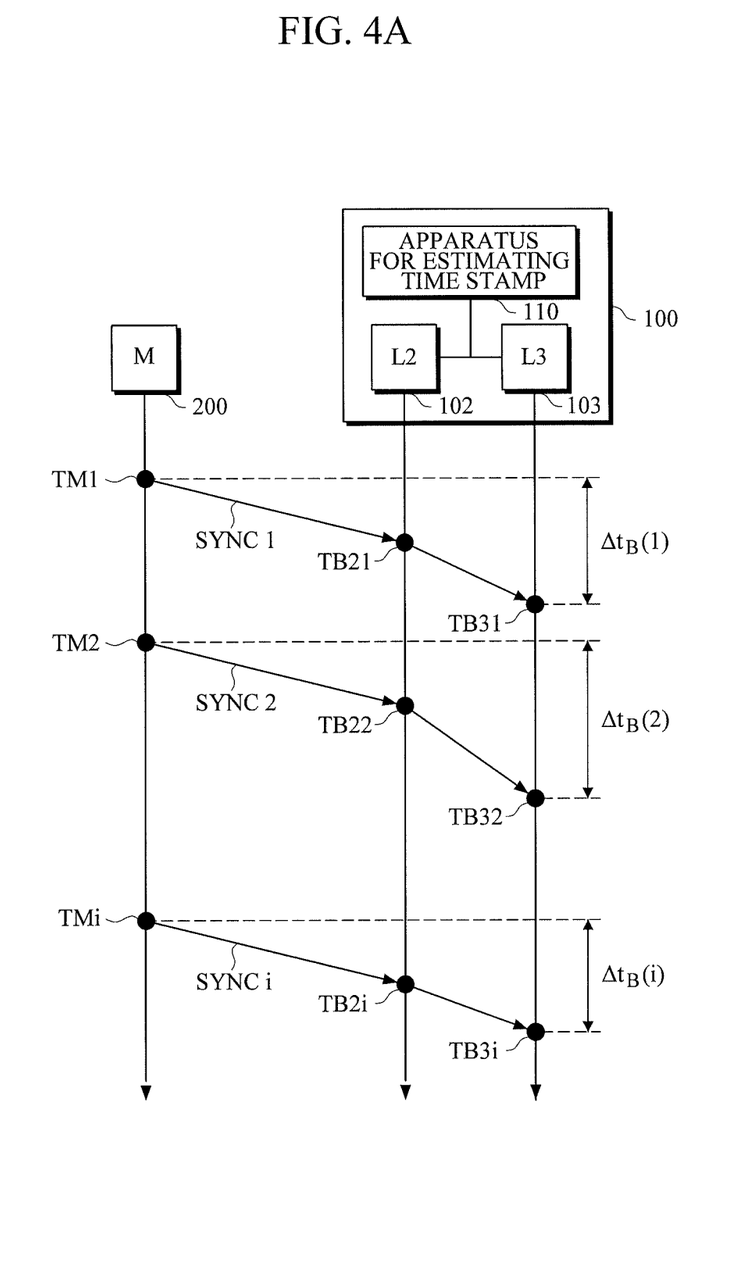
FIGS. 4A and 4B are diagrams illustrating examples of synchronizing the clock of a master and the clock of a virtual time-stamping apparatus.
Figure 4B:
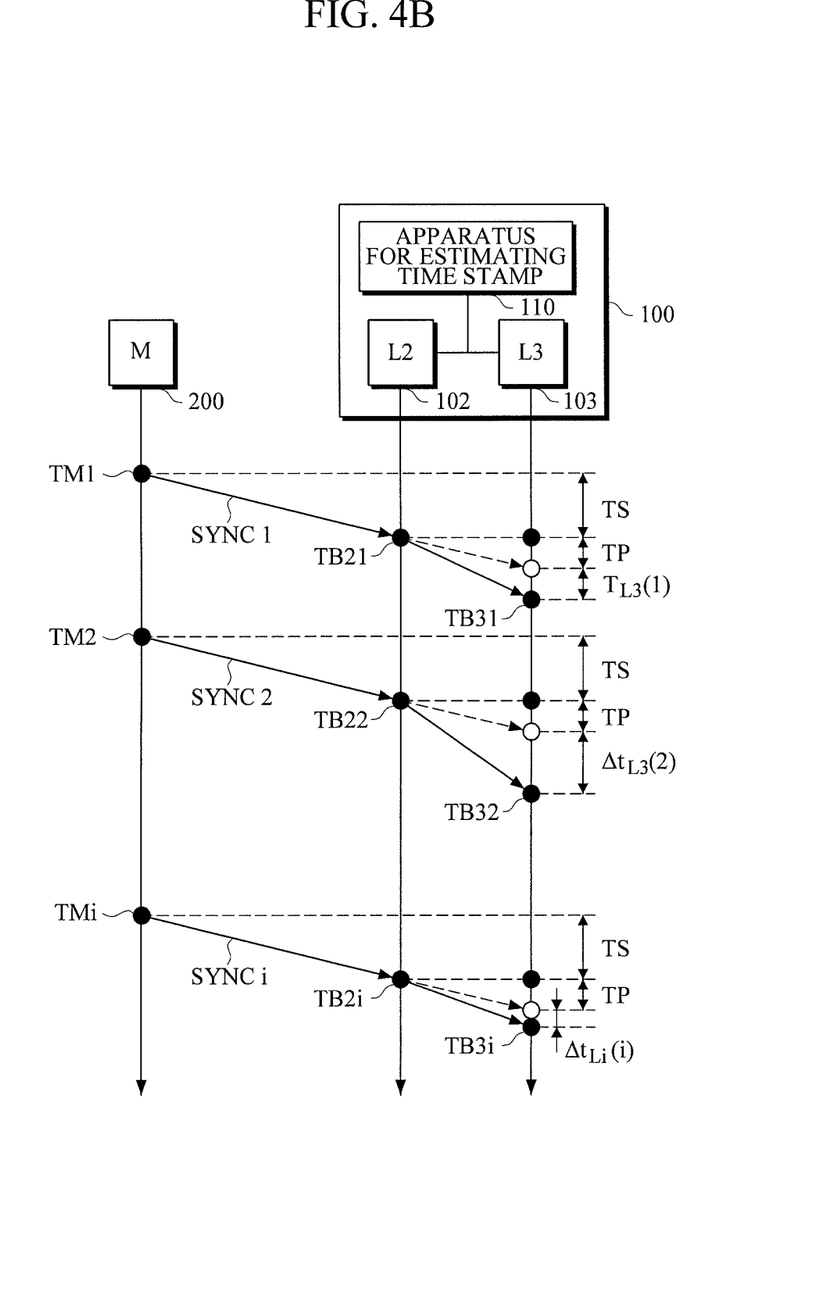

FIGS. 4A and 4B illustrate examples of synchronizing the clock of the master 200 and the clock of the virtual time-stamping apparatus 100.

In the examples illustrated in FIGS. 4A and 4B, unlike in the example illustrated in FIG. 3, there may be delay variations because other regular data traffic is input to other ports of the Layer 2 module 102 than the port that is connected to the master 200.

In a case in which the i-th synchronization message SYNC i is received via multiple ports at the same time together with other regular data, the i-th synchronization message SYNC i may need to wait for the regular data to be processed. A waiting time experienced by the i-th synchronization message SYNC i may vary depending on the length and the time of arrival of the regular data. Accordingly, delay variations may occur between the Layer 2 module 102 and the Layer 3 module 103. In response to a delay variation occurring, the i-th Layer 3 time stamp value TB3$i$ that corresponds to the time of arrival of the i-th synchronization message SYNC i at the Layer 3 module 103 may be represented by Equation (2):

$$TB3i = TMi + \Delta t_B(i) \quad (2)$$

wherein TMi indicates the time of departure of the i-th synchronization message SYNC i from the master 200 and $\Delta t_B(i)$ indicates the amount of time that it takes for the i-th synchronization message SYNC i to be transmitted from the master 200 to the Layer 3 module 103 of the virtual time-stamping apparatus 100.

The example illustrated in FIG. 4A, i.e., an example of measuring a time stamp value, is further described with reference to FIG. 4B.

Referring to FIG. 4B, a delay in the transmission of data from the Layer 2 module 102 to the Layer 3 module 103 may include the amount of time that it takes for the i-th synchronization message SYNC i to arrive at the virtual time-stamping apparatus 100 from the master 200, the amount of time that it takes for the i-th synchronization message SYNC i to be transmitted from the Layer 2 module 102 to the Layer 3 module 103 without any delay being caused by other regular data, and a waiting time experienced by the i-th synchronization message SYNC i while waiting for any regular data to be processed. A delay $\Delta t_B(i)$ in the transmission of data from the Layer 2 module 102 to the Layer 3 module 103 may be represented by Equation (3):

$$\Delta t_B(i) = TP + \Delta t_{L3}(i) + TS \quad (3)$$

where $\Delta t_{L3}(i)$ indicates a delay variation, TP indicates the amount of time that it takes for the i-th synchronization message SYNC i to be transmitted from the Layer 2 module 102 to the Layer 3 module 103 without any delay being caused by other regular data, and TS indicates the amount of time that it takes for the i-th synchronization message SYNC i to arrive at the virtual time-stamping apparatus 100 from the master 200.

Referring to Equation (3), the i-th Layer 2 time stamp value TB2$i$ that is measured at the time of arrival of the i-th synchronization message SYNC i at the Layer 2 module 102 may be estimated by measuring the i-th Layer 3 time stamp value TB3$i$ that is at the time of arrival of the i-th synchronization message SYNC i at the Layer 3 module 103. For example, the i-th Layer 2 time stamp value TB2$i$ may be estimated by subtracting an estimated delay $\Delta t_{L3}(i)'$ and the data processing time TP of the Layer 2 module 102 from the i-th Layer 3 time stamp value TB3$i$.

The apparatus 110 may receive the i-th Layer 3 time stamp value TB3$i$ from an upper layer together with the i-th synchronization message SYNC i. To perform a synchronization protocol, the apparatus 110 may use an estimated time stamp value that is similar to the i-th Layer 2 time stamp value TB2$i$, instead of using the Layer 3 time stamp value TB3$i$. An example of obtaining the estimated time stamp value that is similar to the Layer 2 time stamp value TB2$i$ is further described.

The apparatus 110 may use a minimum filter (not shown) with a minimum delay to estimate a delay variation between the Layer 2 module 102 and the Layer 3 module 103.

The apparatus 110 may store the i-th Layer 3 time stamp value TB3$i$, which is measured in the Layer 3 module 103, in a storage such as, for example, a window FIFO buffer. The apparatus 110 may be provided with the i-th master time stamp value TMi that is measured at the time of transmission of the i-th synchronization message SYNC i by the master 200. Accordingly, the apparatus 110 may store the i-th synchronization message SYNC i and the i-th Layer 3 time stamp value TB3$i$, together with the i-th master time stamp value TMi.

The apparatus 110 may input the difference between the two time stamp values stored therein, i.e., the difference (TB3$i$–TMi) between the i-th Layer 3 time stamp value TB3$i$ and the i-th master time stamp value TMi, to a minimum filter (not shown).

The minimum filter may output a minimum of a number of values input thereto. Assume that a delay in the propagation of data from the master 200 to the virtual time-stamping apparatus 100, i.e., the time TS, is uniform. The minimum filter may select a minimum of a plurality of processing time values (i.e., TP+$\Delta t_{L3}(i)$) corresponding to the amount of time that it takes to transmit the i-th synchronization message SYNC i from the Layer 2 module 102 to the Layer 3 module 103 except for a delay in the propagation of the i-th synchronization message SYNC i from the master 200 to the Layer 2 module 102. The selected minimum may be a shortest waiting time that can be experienced by the i-th synchronization message SYNC i while waiting for other regular data to be processed. The selected minimum may be such a shortest processing time that the i-th synchronization message SYNC i can be readily transmitted from the Layer 2 module 102 and the Layer 3 module 103 almost without any delay.

In response to the difference between the i-th Layer 3 time stamp value TB3$i$ and the i-th master time stamp value TMi being smaller than a minimum previously selected by the minimum filter, the difference between the i-th Layer 3 time stamp value TB3$i$ and the i-th master time stamp value TMi may become a new minimum, and the i-th Layer 3 time stamp value TB3$i$ may be set as a reference time stamp value. The i-th Layer 3 time stamp value TB3$i$ may be measured at the time of arrival of the i-th synchronization message SYNC i at the Layer 3 module 103 by the apparatus 110 or another apparatus that is disposed in the Layer 2 module 102 or the Layer 3 module 103. Assume that the i-th Layer 3 time stamp value TB3$i$ is is measured by the apparatus 110.

For example, the apparatus 110 may calculate the period of transmission of the i-th synchronization message SYNC i by the master 200. As another example, the period of transmission of the synchronization message SYNC i by the master 200 may be calculated by another apparatus, and the result of the calculation may be input to the apparatus 110.

An example of calculating the period of transmission of a synchronization message by the master 200 is further described.

The apparatus 110 may count a time stamp value using a local clock that operates in the Layer 3 module 103 at an operating frequency. In response to a synchronization message being received, the apparatus 110 may measure a time stamp value at the time of receipt of the synchronization message.

A difference between a first Layer 3 time stamp value TB31 that is measured at the time of receipt of a first synchronization message SYNC 1 by the Layer 3 module 103 and a time stamp value TB32 that is measured at the receipt of a second synchronization message SYNC 2 by the Layer 3 module 103 may be represented as TB32-TB31. Similarly, a difference del_ts(i) between the i-th Layer 3 time stamp value TB3($i$) that is measured at the time of receipt of the i-th synchronization message SYNC i by the Layer 3 module 103 and an (i−1)-th Layer 3 time stamp value TB3(i−1) that is measured at the time of receipt of an (i−1)-th synchronization message SYNC (i−1) by the Layer 3 module 103 may be represented by Equation (4):

$$\text{del\_}ts(i) = TB3(i) - TB3(i-1) \qquad (4).$$

A difference between a first master time stamp value TM1 that is measured at the time of departure of the first synchronization message SYNC 1 from the master 200 and a second Layer 2 time stamp value TM2 that is measured at the time of departure of the second synchronization message SYNC 2 from the master 200 may be represented as TM2−TM1. Similarly, a difference del_tm(i) between the i-th master time stamp value TM(i) that is measured at the time of departure of the i-th synchronization message SYNC i from the master 200 and an (i−1)-th master time stamp value TM(i−1) that is measured at the time of departure of the (i−1)-th synchronization message SYNC (i−1) from the master 200 may be represented by Equation (5):

$$\text{del\_}tm(i) = TM(i) - TM(i-1) \qquad (5).$$

An average period mean_ts(i) of transmission of the i-th synchronization message SYNC i may be calculated using a time stamp value that is measured using the local clock of the Layer 3 module 103, as indicated by Equation (6):

$$\text{mean\_}ts(i) \text{mean\_}ts(i-1)*(\text{beta}-1)/\text{beta} + \text{del\_}ts(i)/\text{beta} \qquad (6)$$

where beta indicates a coefficient to calculate average period mean_ts(i).

A ratio alpha(i) of the frequency of the clock of the master 200 and the frequency of the local clock of the Layer 3 module 103 may satisfy the following equation: alpha(i)=del_tm(i)/mean_ts(i). The ratio alpha(i) multiplied by a time stamp value that is measured using the local clock of the Layer 3 module 103 may be converted into a time stamp value that is measured using the clock of the master 200, and this may be interpreted as synchronizing the time stamp value measured using the local clock of the Layer 3 module 103 with the frequency of the clock of the master 200.

The apparatus 110 may add a Layer 3 time stamp value used to produce a minimum selected by the minimum filter and the period of transmission of a synchronization message that is calculated in the Layer 3 module 103. In response to the previous minimum selected by the minimum filter being less than a current minimum, the apparatus 110 may add a Layer 3 time stamp value used to produce the previous minimum and the period of transmission of a synchronization message.

The apparatus 110 may estimate a time stamp value corresponding to the time of arrival of a synchronization message at the Layer 3 module 103 by adding a Layer 3 time stamp value used to produce a minimum and the period of transmission of a synchronization message that is calculated in the Layer 3 module 103.

Figure 5:
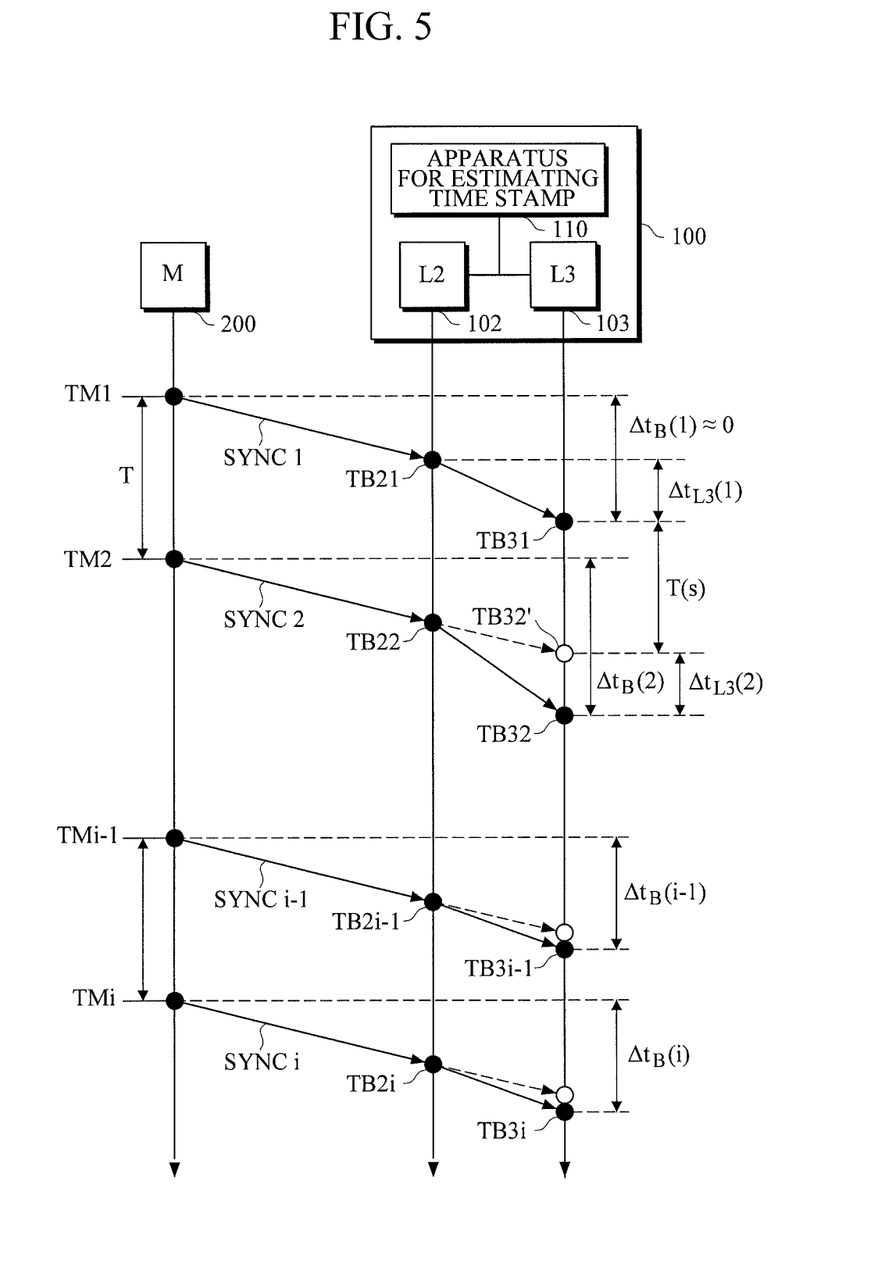
FIG. 5 is a diagram illustrating an example of estimating a time stamp using a minimum filter.

FIG. 5 illustrates an example of estimating a time stamp value using a minimum filter.

Referring to FIG. 5, the master 200 may transmit a synchronization message to the virtual time-stamping apparatus 100 at a period T(s) (i.e., mean_ts(i) of Equation (6)). The apparatus 110 of the virtual time-stamping apparatus 100 may sequentially store and compare differences between Layer 3 time stamp values that are measured in the Layer 3 module 103 and master time stamp values that are measured and provided by the master 200. The apparatus 110 may set a time stamp value that is measured in the Layer 3 module 103 and used to produce a minimum of the differences between the Layer 3 time stamp values measured in the Layer 3 module 103 and the master time stamp values transmitted by the master 200 as a reference time stamp value.

Referring to FIG. 5, if the difference between the first Layer 3 time stamp value TB31 and the first master time stamp value TM1 that correspond to the first synchronization message SYNC 1 is a minimum, a second synchronization message SYNC 2 may be detected at intervals of the period T(s) because a synchronization message is transmitted by the master 200 at intervals of the period T(s). Accordingly, the estimated time of arrival of the second synchronization message SYNC 2 at the Layer 3 module 103 may be TB32'. However, the actual time of arrival of the second synchronization message SYNC 2 may be TB32, which is $\Delta t_{L3}(2)$ apart from TB32'. In the example illustrated in FIG. 5, the estimated Layer 3 time stamp value TB32', instead of the Layer 3 time stamp value TB32 that is measured in the Layer 3 module 103, may be used in a synchronization process. For example, in a case in which the processing time TP is already known, a time stamp value of Layer 2 (or a time stamp value between Layers 1 and 2) may be obtained by subtracting a time stamp value measured in the Layer 2 module 102 and the processing time TP from the estimated time stamp value TB32'.

Figure 6:
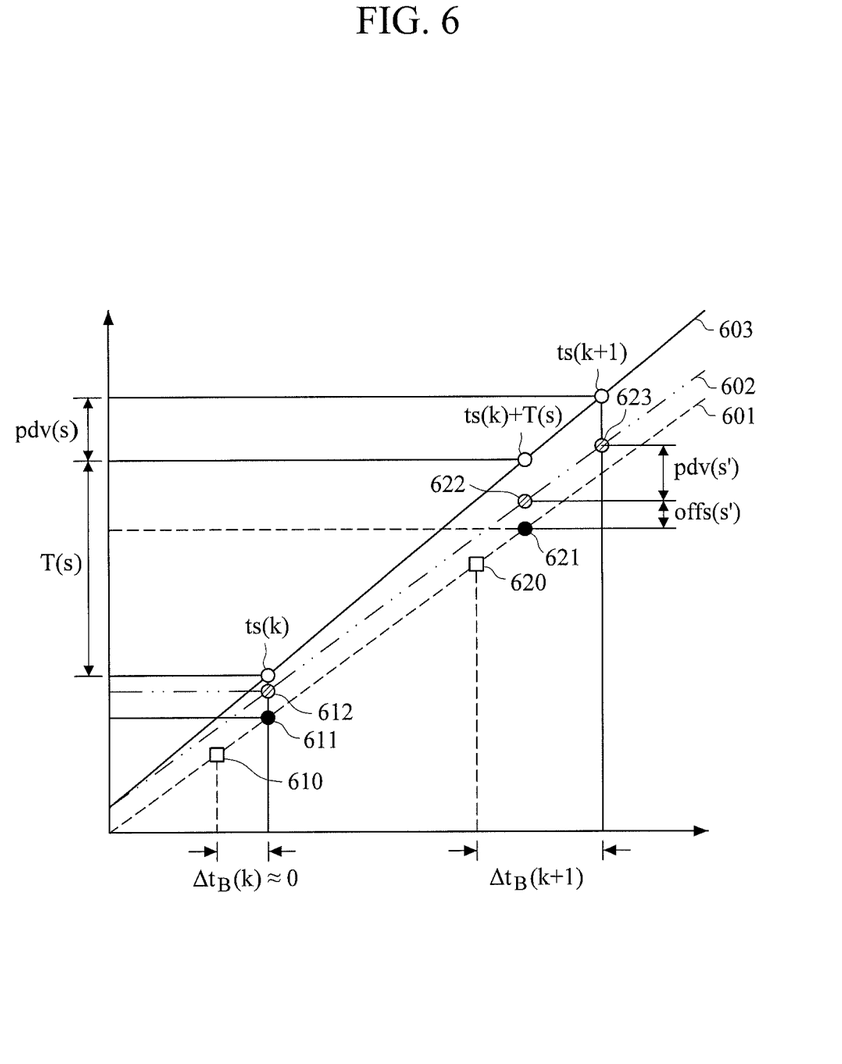
FIG. 6 is a diagram illustrating an example of the relationship between a time stamp of a master and a time stamp measured by a virtual time-stamping apparatus.

FIG. 6 illustrates an example of the relationship between the master 200 and the measurement of a time stamp value by the virtual time-stamping apparatus 100.

Referring to FIG. 6, the X-axis represents actual time, and the Y-axis represents the time of the virtual time-stamping apparatus 100. Since the time of the master 200 is almost the same as actual time, it is assumed that the X-axis also represents the time of the master 200. In a case in which the difference between a time stamp value that is measured at the time of arrival of a k-th synchronization message at the Layer 3 module 103 and a time stamp value of the master 200 being a minimum, a time stamp value for a (k+1)-th synchronization message may be measured, calculated, and estimated based on the time stamp value for the k-th synchronization message, and this is further described.

Assume that the amount of time that it takes for a synchronization message to arrive at the Layer 2 module 102 of the virtual time-stamping apparatus 100 from the master 200, i.e., the propagation delay time TS, is uniform, and that only a delay in the transmission of a synchronization message from the Layer 2 module 102 and the Layer 3 module 103 varies. Referring to FIG. 6, a time stamp value 610 that is measured by the master 200 may be the same as a time stamp value that is measured in the Layer 2 module 102 except that it includes the propagation delay time TS.

Referring to FIG. 6, a dotted line 601 represents a plurality of time stamp values that are obtained using the clock of the master 200, a solid line 603 represents a plurality of time stamp values that are obtained using the clock of the Layer 3 module 103, and a dotted line 602 represents a plurality of time stamp values that are obtained by synchronizing the clock of the Layer 3 module 103 in frequency with the clock of the master 200. The dotted line 601 represents a time stamp value measured at the time of departure of each synchronization message from the master 200, and the solid line 603 and the dotted line 602 both represent a time stamp value that is measured at the time of arrival of each synchronization message at the Layer 3 module 103 of the virtual time-stamping apparatus 100.

Referring to FIG. 6, for a k-th synchronization message, the apparatus 110 may obtain the time stamp value 610 that is measured by the master 200, a time stamp value ts(k) that is measured using the clock 601 of the virtual time-stamping apparatus 100, and an adjusted time stamp value 612 that is measured using an adjusted clock 602 obtained by synchronizing the local clock 603 of the Layer 3 module 103 in frequency with the clock 601 of the master 200.

In response to a synchronization message being transmitted from the master 200 to the virtual time-stamping apparatus 100, the apparatus 110 may store the difference between the time stamp value 610 and the time stamp value 612 in a FIFO buffer as a k-th difference value $\Delta t_B(k)$. The number of difference values that can be stored in the FIFO buffer may vary depending on the size of the FIFO buffer. In response to the size of the FIFO buffer being N, the apparatus 110 may store difference values that are calculated for N synchronization messages. The apparatus 110 may compare the k-th difference value $\Delta t_B(k)$ with the difference values previously stored in the FIFO buffer.

In response to the k-th difference value $\Delta t_B(k)$ being smaller than any one of the previously-stored difference values, the apparatus 110 may set the time stamp value 612 as a reference time stamp value because the time stamp value 612 is produced in a shortest processing time for transmitting a synchronization message from the Layer 2 module 102 to the Layer 3 module 103. The apparatus 110 may add the period Ts, which is the period of transmission of a synchronization message, to the time stamp value 612. The period T(s) may be calculated by synchronizing the clock 603 of the Layer 3 module 103 in frequency with the clock 601 of the master 200.

In response to the k-th difference value $\Delta t_B(k)$ for the k-th synchronization message, i.e., the difference the time stamp value 612 and the time stamp value 610, being a minimum, the apparatus 110 may add the period T(s) to the k-th time stamp value ts(k) that operates in accordance with the local clock 603 of the Layer 3 module 103. The result of the addition of the time stamp value ts(k) and the period T(s) may correspond to an estimated time of arrival of a (k+1)-th synchronization message at the Layer 3 module 103 in case of no delay variation. The period T(s) may be an average of two difference values that are measured using the local clock 603 of the Layer 3 module 103 for two consecutive synchronization messages.

In response to the (k+1)-th synchronization message being input to the virtual time-stamping apparatus 100, the apparatus 110 may compare a difference value $\Delta t_B(k+1)$ corresponding to the (k+1)-th synchronization message with a current minimum difference value. The difference value $\Delta t_B(k+1)$ may correspond to the difference between a time stamp value 620 that is measured by the master 200, and that is included in the (k+1)-th synchronization message, and a time stamp value 623 that is obtained by adjusting a time stamp value ts(k+1) measured in the Layer 3 module 103 of the virtual time-stamping apparatus 100 to be synchronized with the frequency of the master 200.

Referring to FIG. 6, in response to the k-th minimum difference value $\Delta t_B(k)$ being smaller than the (k+1)-th difference value $\Delta t_B(k+1)$, the apparatus 110 may determine that a delay variation has occurred in the time stamp value ts(k+1).

To remove a delay variation from the time stamp value ts(k+1), the apparatus 110 may add the time stamp value ts(k) used to produce the k-th difference minimum $\Delta t_B(k)$ to the period T(s), and may subtract the result of the addition (i.e., ts(k)+T(s)) from the time stamp value ts(k+1). The apparatus 110 may calculate a delay variation pdv(s) using Equation (7):

$$pdv(s)=ts(k+1)-\{ts(k)+T(s)\} \quad (7)$$

On the other hand, in response to the (k+1)-th difference value $\Delta t_B(k+1)$ being smaller than a current minimum, i.e., the k-th difference value $\Delta t_B(k)$, the apparatus 110 may calculate the delay variation pdv(s) based on a minimum min_$\Delta t_B$ of one or more difference values previous to the k-th difference value $\Delta t_B(k)$ (for example, $\Delta t_B(1)$, $\Delta t_B(2)$, . . . , $\Delta t_B(k-1)$) and the period T(s).

Equation (7) may be generalized into Equation (8):

$$pdv(s)=ts(k+1)-\{min\_ts+T(s)*(k-j+1)\}$$

$$min\_ts=ts(j) \quad (8)$$

where min_ts indicates a measured time ts(j) of arrival of a j-th synchronization message at the Layer 3 module 103 that produces the minimum difference value min_$\Delta t_B$, i=1, 2, . . . , j, . . . , k−1, k, and j is an index value with mints.

Referring to Equation (8), the delay variation pdv(s) may correspond to a delay variation that is calculated using a time stamp value that is measured using the local clock 603 of the Layer 3 module 103. Since the delay variation pdv(s) is calculated based on a measurement obtained using the local clock 603 of the Layer 3 module 103 that is yet to be synchronized with the clock 601 of the master 200, the apparatus 110 may adjust the delay variation pdv(s) by synchronizing the local clock 603 of the Layer 3 module 103 in frequency with the clock 601 of the master 200.

As a result, an adjusted delay variation pdv(s') may be obtained. The adjusted delay variation pdv(s') may correspond to the difference between an adjusted time stamp value 623 that is obtained by synchronizing the time stamp value ts(k+1) in frequency with the clock 601 of the master 200 and an estimated time of arrival of the (k+1)-th synchronization message at the Layer 3 module 103 (i.e., min_ts+T(s)*(k−j+1)).

The apparatus 110 may subtract the adjusted delay variation pdv(s') from the time stamp value 623, thereby obtaining a Layer 2 time stamp value 622 with a minimum delay variation for the adjusted local clock 602 that is obtained by synchronizing the local clock 603 of the Layer 3 module 103 in frequency with the clock of the master. A delay variation (for example, the delay variation pdv(s)) yet to be adjusted by synchronizing the local clock 603 of the Layer 3 module 103 in frequency with the clock 601 of the master 200 is referred to as a first delay variation, and a delay variation (for example, pdv(s')) adjusted by synchronizing the local clock 603 of the Layer 3 module 103 in frequency with the clock 601 of the master 200 is referred to as a second delay variation.

The virtual time-stamping apparatus 100 may synchronize itself with the master 200 by calculating a time offset offs(s') based on the Layer 2 time stamp value 622. For example, the time offset offs(s') may correspond to the difference between the Layer 2 time stamp value 622 and a time stamp value 621 that is synchronized with the clock 601 of the master 200. The clock 601 of the master 200 and the local clock 603 of the virtual time-stamping apparatus 100 may have different frequencies and may have a time offset therebetween. That is, the clock 601 of the master 200 and the local clock 603 of the virtual time-stamping apparatus 100 may begin to measure time at different times. The adjusted clock 602 obtained by synchronizing the local clock of the virtual time-stamping apparatus 100 in frequency with the clock of the master 200 may still have a time offset from the clock of the master 200. Accordingly, it is possible to obtain time stamp values that are synchronized with the clock 601 of the master 200 by subtracting the time offset between the adjusted clock 602 and the clock 601 of the master 200 from the adjusted clock 602.

Figure 7:
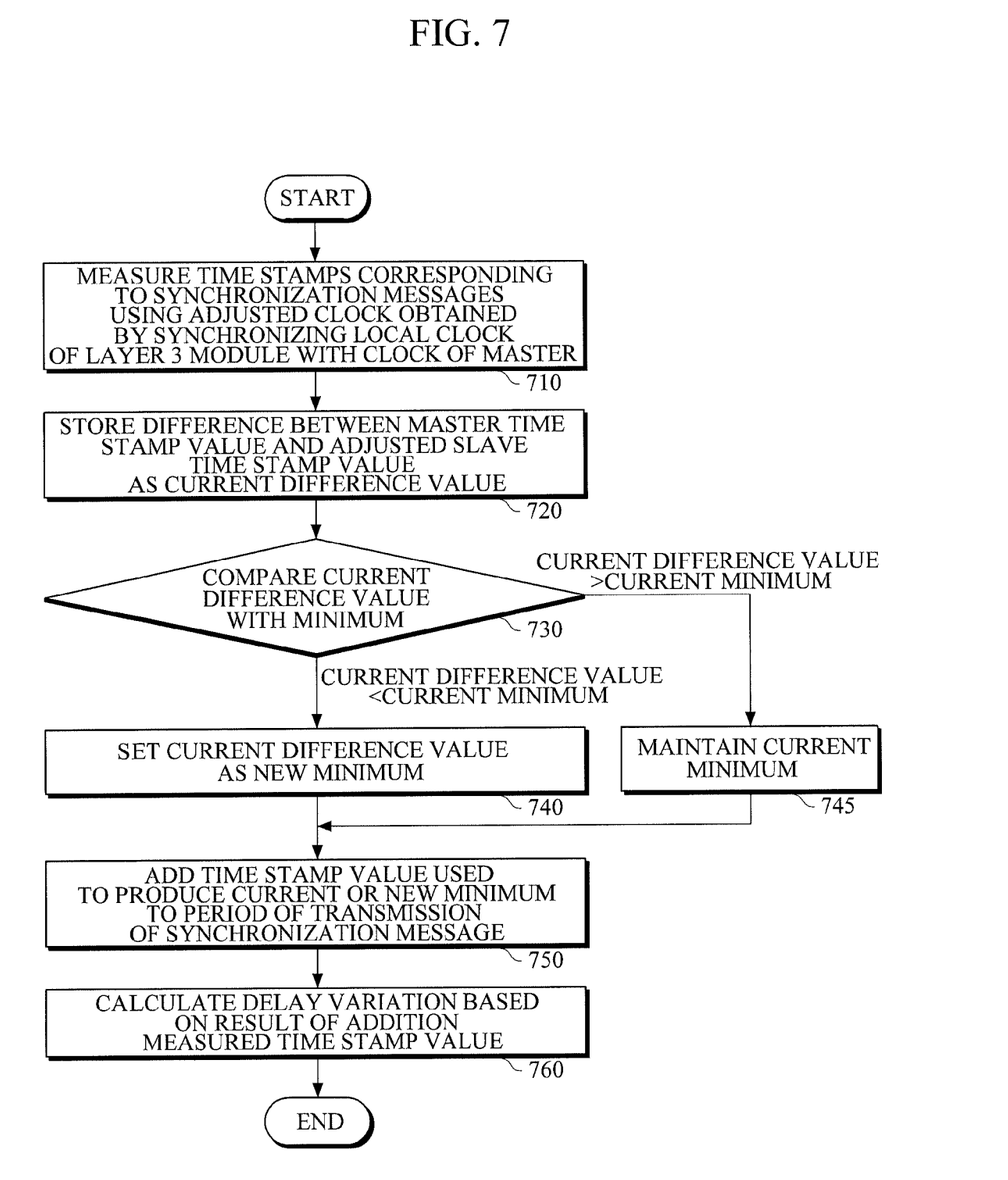
FIG. 7 is a flowchart illustrating an example of a method of estimating a time stamp.

FIG. 7 illustrates an example of a method of estimating a time stamp.

Referring to FIG. 7, in 710, the apparatus 110 may measure a time stamp value corresponding to an input synchronization message based on a second time stamp value that is obtained by adjusting a first time stamp value that is measured for the input synchronization message in the Layer 3 module 103 in accordance with the clock of the master 200. The time stamp value corresponding to the input synchronization message may be measured by another device, and may be provided to the apparatus 110. A time stamp value corresponding to the master 200 may be extracted from the input synchronization message, and the extracted time stamp value may be provided to the apparatus 110. A time stamp value corresponding to the is master 200 may be extracted from the input synchronization message in a first layer, and the extracted time stamp value may be provided to the apparatus 100.

In 720, the apparatus 110 may store the difference between the master time stamp value and the second time stamp value as a current delay cur_delay.

In 730, the apparatus 110 may compare the current difference value cur_delay with a current minimum min_delay using a minimum filter (not shown). In 740, in response to the current delay cur_delay being less than the current minimum min_delay, the apparatus 110 may reset the current delay cur_delay as a new minimum min_delay.

On the other hand, in 745, in response to the current delay cur_delay being greater than the current minimum min_delay, the apparatus 110 may maintain the current minimum min_delay.

In 750, the apparatus 110 may add a second time stamp value used to produce the current or new minimum min_delay obtained in 740 or 745 and the period of transmission of a synchronization message that is calculated in the Layer 3 module 103.

In 760, the apparatus 110 may calculate an adjusted delay variation value pdv(s'), which is a second delay variation value, based on the result of the addition performed in 750 and the first time stamp value.

The apparatus 110 may calculate a time offset value based on the adjusted delay variation value pdv(s'), and may synchronize itself with the master 200 using the calculated time offset value.

Figure 8:
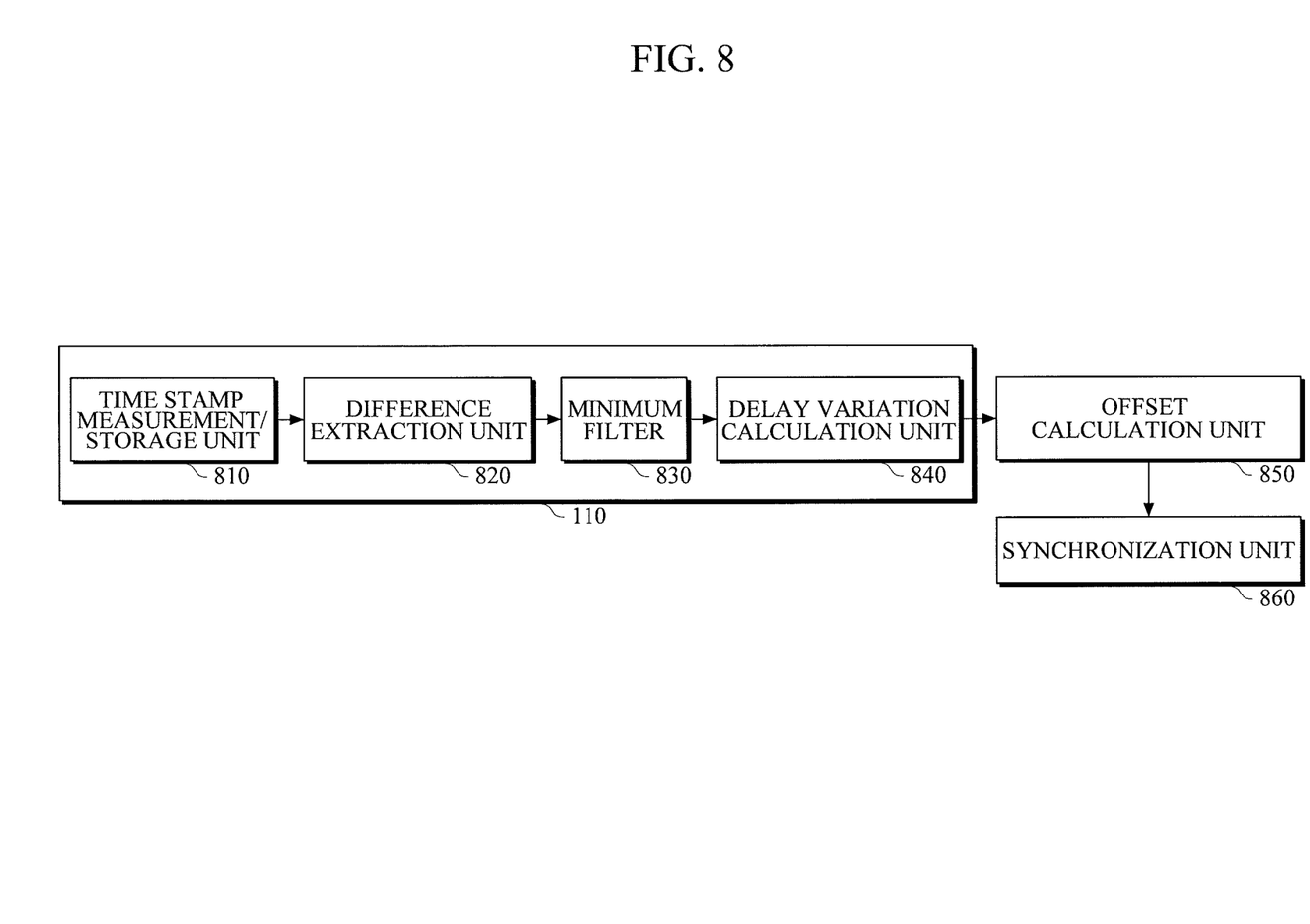
FIG. 8 is a block diagram illustrating an example of an apparatus for estimating a time stamp.

FIG. 8 illustrates an example of the apparatus 110 illustrated in FIG. 1.

Referring to FIG. 8, the apparatus 110 includes a time stamp measurement/storage unit 810, a difference extraction unit 820, a minimum filter 830, and a delay variation calculation unit 840. The apparatus 110 also includes an offset calculation unit 850 and a synchronization unit 860.

The time stamp measurement/storage unit 810 may measure and store a first time stamp value. The time stamp measurement/storage unit 810 may extract from a synchronization message a third time stamp value that is measured at the time of transmission of the synchronization message by the master 200 and may store the extracted third time stamp value.

The difference extraction unit 820 may obtain a second time stamp value by adjusting the first time stamp value to be synchronized in frequency with the clock of the master 200. The difference extraction unit 820 may extract the difference between the second and third time stamp values. The difference extraction unit 820 may perform such difference extraction whenever a synchronization message that is transmitted by the master 200 at regular intervals of time is received. The difference extraction unit 820 may enter the difference between the second and third time stamp values to the minimum filter 830.

The minimum filter 830 may be configured to temporarily store one or more difference values provided by the difference extraction unit 820 and to determine a minimum of the difference values. The minimum filter 830 may compare a current difference value currently being input thereto with a minimum of a plurality of previous difference values previously input thereto. The minimum filter 830 may maintain the minimum of the previous difference values in response to the current difference value being greater than the minimum of the previous difference values. In response to the current difference value being less than the minimum of the plurality of previous difference values, the minimum filter 830 may update the minimum of the plurality of previous difference values with the current difference value.

The delay variation calculation unit 840 may estimate the time of arrival of a current synchronization message at the Layer 3 module 103 based on a minimum provided by the minimum filter 830, and may calculate a delay variation value pdv(s') that corresponds to the difference between the estimated time of arrival of the current synchronization message at the Layer 3 and the second time stamp value.

In a case in which a j-th synchronization message is used to produce a current minimum and the current synchronization message is a k-th synchronization message, the delay variation calculation unit 840 may estimate the time of arrival of the k-th synchronization message at the Layer 3 by multiplying the period of transmission of a synchronization message by (k−j+1) and adding the result of the multiplication to a second time stamp value corresponding to the j-th synchronization message. The period of transmission of a synchronization message by the master 200 may be obtained by measuring the period of transmission of a synchronization message by the master 200 using the local clock of the apparatus 110 and adjusting the result of the measurement in accordance with the clock frequency of the master 200.

The delay variation calculation unit 840 may estimate the time of arrival of the current synchronization message at the Layer 2 module 102 by subtracting the delay variation value pdv(s') from the second time stamp value.

The offset calculation unit 850 may calculate a time offset value that corresponds to the offset between the local clock of the apparatus 110 and the clock of the master 200 based on the delay variation value pdv(s').

The synchronization unit 860 may synchronize the local clock of the apparatus 110 with the clock of the master 200 using the calculated time offset value. For example, the synchronization unit 860 may be implemented as a circuit such as a phase locked loop (PLL).

As described above, it is possible to measure a time stamp value corresponding to high-speed serial data at the interface between Layers 2 and 3 and precisely estimate a time stamp value corresponding to multiplexed low-speed parallel data between a Layer 1 and the Layer 2 based on the measured time stamp value. Therefore, it is possible to reduce the size and area of hardware equipment for measuring the time stamp value corresponding to the multiplexed low-speed parallel data between the Layers 1 and 2. In addition, it is possible to provide a precise time stamp value by estimating an equivalent of a time stamp value that is measured in the Layer 2 even in an upper layer (for example, the Layer 3 or higher).

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for estimating a time stamp, which synchronizes itself in time with a master, the apparatus comprising:
   a storage memory; and
   at least one processor implementing an operation of:
   a difference extraction unit configured to extract a difference between a second time stamp value, which is obtained by adjusting a first time stamp value that is measured at a time of arrival of a synchronization message transmitted by the master at a Layer 3 to be synchronized in frequency with a clock of the master, and a third time stamp value, which is measured at a time of departure of the synchronization message from the master;
   a minimum filter configured to select a minimum from one or more difference values extracted by the difference extraction unit; and
   a delay variation calculation unit configured to estimate a time of arrival of a current synchronization message at the Layer 3 based on the selected minimum and calculate a delay variation, which corresponds to a difference between the estimated time of arrival of the current synchronization message at the Layer 3 and the second time stamp value.

2. The apparatus of claim 1, wherein the minimum filter is further configured to compare a current difference value provided by the difference extraction unit with a minimum of one or more previous difference values previously provided by the difference extraction unit, to maintain the minimum of the previous difference values in response to the current difference value being greater than the minimum of the previous difference values, and to update the minimum of the previous difference values with the current difference value in response to the current difference value being less than the minimum of the previous difference values.

3. The apparatus of claim 1, wherein the at least one processor further implements an operation of:
   a time stamp measurement/storage unit configured to extract the third time stamp value from the synchronization message, store the extracted third time stamp value, and measure and store the first time stamp value.

4. The apparatus of claim 1, wherein the delay variation calculation unit is further configured to, in response to a synchronization message used to produce the selected minimum being a j-th synchronization message and the current synchronization message being a k-th synchronization message, estimate a time of arrival of the k-th synchronization message at the Layer 3 by multiplying a period of transmission of a synchronization message by (k−j+1) and adding the result of the multiplication to a second time stamp value corresponding to the j-th synchronization message.

5. The apparatus of claim 4, wherein the period of transmission of a synchronization message is obtained by adjusting a period of transmission of a synchronization message that is measured using a local clock of the apparatus in accordance with the frequency of the clock of the master.

6. The apparatus of claim 5, wherein the delay variation calculation unit is further configured to estimate a time of arrival of the current synchronization message at a Layer 2 by subtracting the calculated delay variation from the second time stamp value.

7. The apparatus of claim 1, wherein the at least one processor further implements an operation of:
   an offset calculation unit configured to calculate a time offset between the local clock of the apparatus and the clock of the master based on the calculated delay variation; and
   a synchronization unit configured to synchronize the apparatus in time with the master using the calculated time offset.

8. A virtual time-stamping apparatus that synchronizes itself in time with a master, the virtual time-stamping apparatus comprising:
   a storage memory;
   at least one processor implementing an operation of:
   a Layer 2 module configured to multiplex data provided by a master and other regular data traffic and transmit the multiplexed data;
   a difference extraction unit for estimating a time stamp, configured to obtain a minimum difference between a second time stamp value, which is obtained by adjusting a first time stamp value that is measured at a time of arrival of a synchronization message transmitted by the master at a Layer 3 to be synchronized in frequency with a clock of the master, and a third time stamp value, which is measured at a time of departure of the synchronization message from the master, and calculate a delay variation, which corresponds to a difference between a time of arrival of a current synchronization message at a Layer 3 and the second time stamp value using the minimum difference; and
   an offset calculation unit configured to calculate an offset between the local clock of the apparatus and the clock of the master based on the calculated delay variation; and
   a synchronization unit configured to synchronize the apparatus in time with the master using the calculated offset.

9. The virtual time-stamping apparatus of claim 8, wherein the difference extraction unit is further configured to estimate the time of arrival of the current synchronization message at the Layer 3 based on the minimum difference and calculate a difference between the estimated time of arrival of the current synchronization message at the Layer 3 and the second time stamp value as the delay variation.

10. The virtual time-stamping apparatus of claim 8, wherein the difference extraction unit comprises a time stamp measurement/storage unit configured to extract the third time stamp value from the synchronization message, store the extracted third time stamp value, and measure and store the first time stamp value.

11. A method of estimating a time stamp for synchronization in time with a master, the method comprising:
- extracting a difference between a second time stamp value, which is obtained by adjusting a first time stamp value that is measured at a time of arrival of a synchronization message transmitted by the master at a Layer 3 to be synchronized in frequency with a clock of the master, and a third time stamp value, which is measured at a time of departure of the synchronization message from the master;
- selecting a minimum from one or more extracted difference values; and
- estimating a time of arrival of a current synchronization message at the Layer 3 based on the selected minimum; and
- calculating a delay variation, which corresponds to a difference between the estimated time of arrival of the current synchronization message at the Layer 3 and the second time stamp value.

12. The method of claim 11, wherein the selecting the minimum comprises:
- comparing a current difference value with a minimum of one or more previous difference values; and
- maintaining the minimum of the previous difference values in response to the current difference value being greater than the minimum of the previous difference values, and updating the minimum of the previous difference values with the current difference value in response to the current difference value being less than the minimum of the previous difference values.

13. The method of claim 11, further comprising:
- extracting the third time stamp value from the synchronization message and storing the extracted third time stamp value; and
- measuring and storing the first time stamp value.

14. The method of claim 11, wherein the calculating the delay variation comprises, in response to a synchronization message used to produce the selected minimum being a j-th synchronization message and the current synchronization message being a k-th synchronization message, estimating a time of arrival of the k-th synchronization message at the Layer 3 by multiplying a period of transmission of a synchronization message by (k−j+1) and adding the result of the multiplication to a second time stamp value corresponding to the j-th synchronization message.

15. The method of claim 14, wherein the period of transmission of a synchronization message is obtained by adjusting a period of transmission of a synchronization message that is measured using a local clock of the apparatus in accordance with the frequency of the clock of the master.

16. The method of claim 15, wherein the calculating the delay variation further comprises estimating a time of arrival of the current synchronization message at a Layer 2 by subtracting the calculated delay variation from the second time stamp value.

17. The method of claim 11, further comprising:
- calculating a time offset between the local clock of the apparatus and the clock of the master based on the calculated delay variation; and
- performing time synchronization with the master using the calculated time offset.

* * * * *